(12) United States Patent  (10) Patent No.: US 9,340,150 B2
Kendrick et al.  (45) Date of Patent: May 17, 2016

(54) ARTICULATED MACHINE PROXIMITY SYSTEM

(71) Applicant: AGCO Corporation, Duluth, GA (US)

(72) Inventors: Patrick Kendrick, Hesston, KS (US);
Lawrence Retzlaff, Hesston, KS (US);
Gerald Johnson, Hesston, KS (US);
Quentin Guhr, Hillsboro, KS (US)

(73) Assignee: AGCO Corporation, Duluth, GA (US)

( * ) Notice: Subject to any disclaimer, the term of this patent is extended or adjusted under 35 U.S.C. 154(b) by 29 days.

(21) Appl. No.: 14/369,776

(22) PCT Filed: Dec. 27, 2012

(86) PCT No.: PCT/US2012/071699
§ 371 (c)(1),
(2) Date: Jun. 30, 2014

(87) PCT Pub. No.: WO2013/101859
PCT Pub. Date: Jul. 4, 2013

(65) Prior Publication Data
US 2015/0029011 A1    Jan. 29, 2015

Related U.S. Application Data

(60) Provisional application No. 61/580,752, filed on Dec. 28, 2011.

(51) Int. Cl.
| G08B 21/00 | (2006.01) |
| B60Q 1/30 | (2006.01) |
| A01F 15/08 | (2006.01) |
| B60D 1/30 | (2006.01) |
| B60D 1/62 | (2006.01) |
| B60D 1/58 | (2006.01) |
| B60D 1/00 | (2006.01) |

(52) U.S. Cl.
CPC ............... *B60Q 1/305* (2013.01); *A01F 15/08* (2013.01); *B60D 1/30* (2013.01); *B60D 1/58* (2013.01); *B60D 1/62* (2013.01); *B60D 2001/008* (2013.01)

(58) Field of Classification Search
None
See application file for complete search history.

(56) References Cited

U.S. PATENT DOCUMENTS

| 5,364,117 | A  | * | 11/1994 | Keith | ...................... | B60D 1/07 |
| | | | | | | 280/442 |
| 7,309,075 | B2 | * | 12/2007 | Ramsey | .................. | B60D 1/36 |
| | | | | | | 280/477 |
| 2002/0125018 | A1 | * | 9/2002 | Bernhardt | ............ | A01B 59/068 |
| | | | | | | 172/439 |
| 2004/0017285 | A1 | * | 1/2004 | Zielinski | .................. | B60D 1/36 |
| | | | | | | 340/431 |
| 2004/0183661 | A1 | * | 9/2004 | Bowman | ................ | G08G 1/165 |
| | | | | | | 340/435 |
| 2007/0194557 | A1 | * | 8/2007 | Caporali | ................ | B60D 1/155 |
| | | | | | | 280/493 |
| 2011/0054729 | A1 | * | 3/2011 | Whitehead | ........... | A01B 69/007 |
| | | | | | | 701/31.4 |

OTHER PUBLICATIONS

European Patent Office, International Search Report for International Application PCT/US2012/071699 mailed on Feb. 5, 2013.

* cited by examiner

*Primary Examiner* — Julie Lieu

(57) ABSTRACT

In one embodiment, a towed implement proximity system, the system comprising: a first device comprising a transceiver, the first device configured to: transmit a signal; receive a first signal at a first angle and a second signal at a second angle responsive to the transmitted signal, the first and second signals comprising first information and second information, respectively, the first and second information each corresponding to respective positional information; and a controller coupled to the first device, the controller configured to determine a relative position in three axes between a first machine and a second machine based on the first and second information.

19 Claims, 5 Drawing Sheets

ARTICULATED MACHINE PROXIMITY SYSTEM

TECHNICAL FIELD

The present disclosure is generally related to articulated machines.

BACKGROUND

An articulated machine generally refers to a combination of two or more machines that include at least a towing machine and a towed machine. One example of an articulated machine may be found in, among other industries, the agricultural equipment industry, such as a combine harvester that tows another vehicle, such as a baler. Combine harvesters (or herein also referred to as merely a combine) harvest crop and then unload the harvested crop, such as grain, from storage bins residing on the combine harvester to the bed of a receiving vehicle, such as a truck bed. A common mechanism for performing this function is by way of an auger tube of a combine unloading auger discharging the grain from the storage bins through the auger tube. Combines also comprise a spreader/chopper discharge assembly located toward the rear of the combine for the discharge of crop material in the form of crop residue. A towed implement, such as a baler, may comprise a pickup assembly (or other apparatus to receive the crop directly through the air or via the ground) and form the accumulated crop residue into bales.

When a combine tows a large implement (e.g., collectively, an articulated machine), such as a large square baler, grain cart, or cob collector, it may be difficult for an operator of the combine to observe or otherwise know of the position of the implement due to poor rearward visibility of the combine. Further, it is difficult to know the proximity of the towed implement in relationship to the combine unloading auger and spreader/chopper discharge assembly. Without knowing the position of the implement, contact may occur between the combine unloading auger and the implement, potentially causing significant damage to either or both machines. It is also important to know the position of the implement if the operator attempts to deliver crop from the combine to the implement such as grain or material other than grain.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
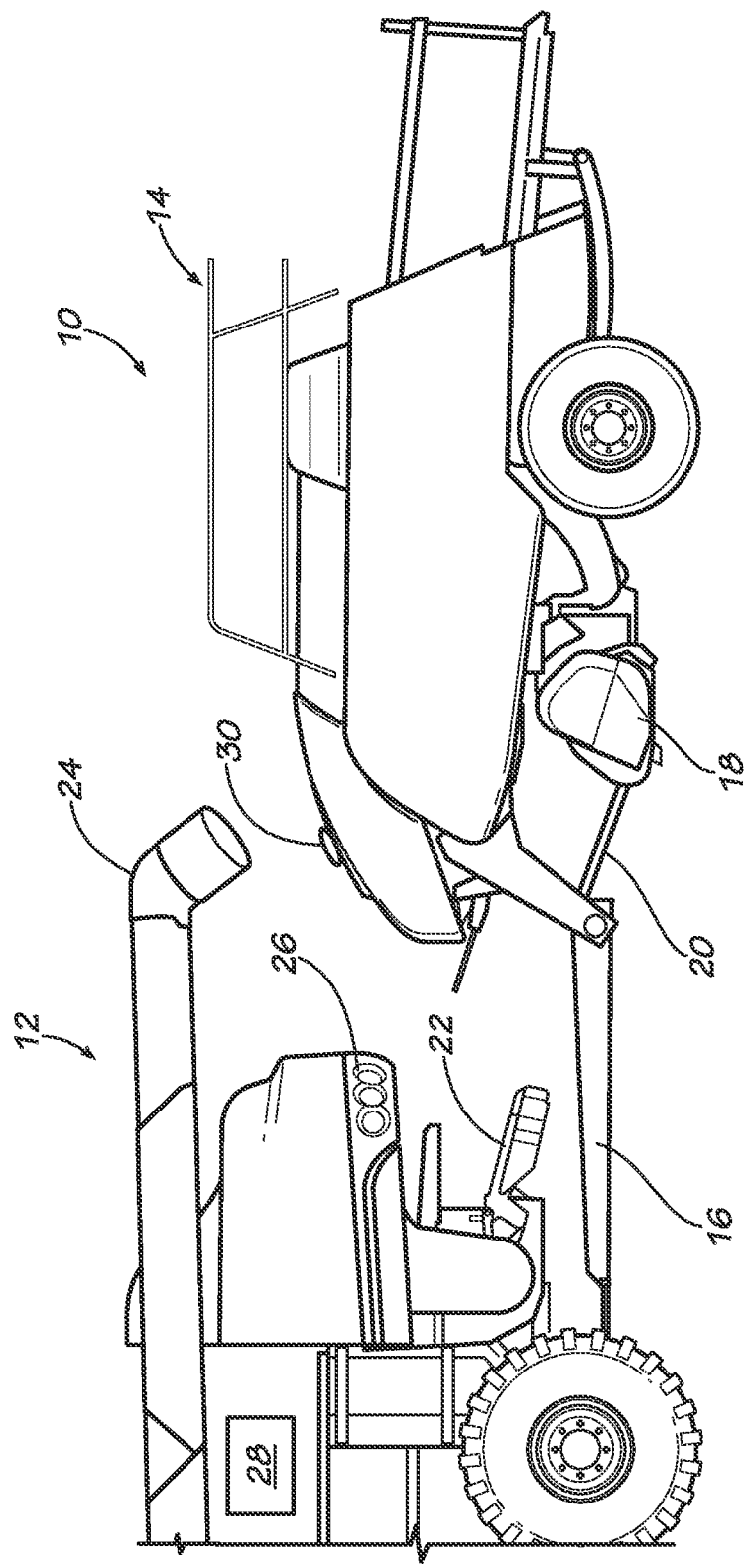
FIG. 1 is an example environment in which an embodiment of an articulated machine proximity system may be implemented.

In one embodiment, an articulated machine proximity system, the system comprising: a first device comprising a transceiver, the first device configured to: transmit a signal; receive a first signal at a first angle and a second signal at a second angle responsive to the transmitted signal, the first and second signals comprising first information and second information, respectively, the first and second information each corresponding to respective positional information; and a controller coupled to the first device, the controller configured to determine a relative position in three axes between a first machine and a second machine based on the first and second information.

Detailed Description

Certain embodiments of an invention comprising an articulated machine proximity system and method are disclosed that provides an accurate position of a towed implement relative to a towing machine in three axes. The three axes consist of pitch, yaw, and roll. In one embodiment, the articulated machine proximity system comprises one or more target devices (e.g., receiver(s), reflector(s)) located on the towed implement (e.g., machine) that receive an initial transmitted signal from one or more sending devices (e.g., transceiver(s)) on the towing machine, and responsive to receiving the transmitted initial signal, provide a response (e.g., reflected or otherwise) signal carrying positional information (e.g., coordinates) back to the sending device. In some embodiments, this arrangement of devices can be reversed (e.g., the initiating signal provided from a device on the towed machine and received at the towing machine). For purposes of facilitating the following description, emphasis is placed on a sending device (e.g., transceiver) sending (e.g., transmitting) a signal to one or more target devices on the towed vehicle and the target responding with positional information via a response signal(s) as one example embodiment among others contemplated to be within the scope of the disclosure. The information provided from the target devices carries positional information from which a controller can derive three axes information and ultimately determine if a collision is imminent, provide an alert or other avoidance measures, and/or identify a location for dispensing product and/or coupling to another machine. The controller located, for instance, in the towing machine, processes the information received and forwarded by the sending device carrying the positional information and computes the proximity of the towing machine to the towed machine based on this relative information. For instance, in one embodiment, this computation may involve the well-known triangulation computation as often utilized in cell tower/wireless device position computations.

As indicated in the background section of the present disclosure, often times the types of machines used to perform the towing are large and present difficulties in observing by an operator the interactions with towed implements, hence providing a risk of collision between the towing and towed machines. This situation is particularly problematic where there are irregularities in movement of the towed and towing machines relative to one another, such as on a steep incline and/or irregular surfaces.

Having summarized certain features of an articulated machine proximity system of the present disclosure, reference will now be made in detail to the description of the disclosure as illustrated in the drawings. While the disclosure is described in connection with these drawings, there is no intent to limit it to the embodiment or embodiments disclosed herein. For instance, the machines described in the present disclosure comprise agricultural machines, and in particular, a combine harvester towing a square baler. However, any articulated machine (e.g., comprising plural vehicles, such as recreational vehicles pulling a car, a sprayer machine pulling fertilizer implements, trucks in a series, etc.) is contemplated to be within the scope of the disclosed embodiments. Further, although the description identifies or describes specifics of one or more embodiments, such specifics are not necessarily part of every embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Referring now to FIG. 1, shown is an example environment 10 in which certain embodiments of an articulated machine proximity system may be implemented. In particular, shown is a towing machine embodied in this example as a combine harvester 12 (herein, also referred to as a combine) and a towed machine embodied in this example as a square baler 14 (herein, also referred to as a baler). The combination of the towing machine and towed machine (e.g., combine 12 and baler 14) is also referred to herein as an articulated machine. One having ordinary skill in the art should appreciate in the context of the present disclosure that the example environment 10 is merely illustrative, and that other towing and/or towed machines (e.g., implements), including additional machines other than just two in the articulated machine, may be used in some embodiments, including for use in the agricultural industry, recreational industry, mining industry, among others. The baler 14 is pivotally attached to the rear of the combine 12 via a tongue 16 which is coupled to a hitch point on the back of the combine 12. The baler 14 may be powered by a hydrostatic motor affixed to the flywheel of the baler 14 drawing its power source from the engine of the combine 12 via a hydrostatic pump.

The tongue 16 is attached to the chassis or main frame of the baler 14. The chassis is made of steel frame construction. The tongue 16 is configured to be coupled to the combine 12 so that crop material from the combine 12 can be transferred from the combine 12 directly to the baler 14 without redirection through the air by the combine and without the use of a conveyor coupled to either the combine 12 or the baler 14. The term "crop material" is intended to include grain and/or material other than grain (MOG), such as crop residue from the combine 12. Moreover, the tongue 16 and the chassis of the baler 14 are configured for the flow of crop material therethrough. The crop material from the combine 12 is directly discharged from the combine 12 to the baler 14. Also, the crop material from the combine 12 does not need to be oriented or moved upward from the back of the combine 12 in order to be transferred to the baler 14 or any other secondary vehicle. Note that other configurations are contemplated, such as those where the crop material is primarily picked up from the ground.

The crop material from the combine 12 is projected to a target defined by the baler 14. The target may be a baler collection device or feeding mechanism such as a pickup 18, and/or a collector such as a transfer pan 20. The pickup 18 may be a rotating drum-type mechanism with flexible tines or teeth for lifting and conveying material from the ground to the baler 14. The pickup 18 may be mounted to the chassis of baler 14 for pivoting movement about an upwardly and rearwardly disposed transverse pivot axis. In one or more embodiments, at least a portion of crop material may be directly received from the combine 12 at the baler 14 without the pickup 18.

At least a portion of the crop material may be directly discharged to a transfer pan in front of a packer which prevents crop material that is thrown to the packer from falling to the ground. Packing forks can grab at least a portion of the crop material collected on the transfer pan and move the crop material back to a stuffer chute.

Also, if desired, crop material may also be lifted or received from the ground with the pickup 18. The pickup 18 may be either configured to receive material directly from the ground or directly from the combine 12. The crop material on the ground may be from the combine 12 towing the baler 14 or some other machine (e.g., vehicle). A portion of crop material received directly from the combine 12 may be discharged from the same location on the combine 12 as any other portion of crop material discharged onto the ground to be picked up by the pickup 18 of the baler 14. However, in one or more embodiments, the combine 12 may have a chaff spreader where at least a portion of the chaff may be directed into the trajectory of the crop material coming out from the combine 12 and a tailboard 22. In another embodiment, the chaff can be directly discharged by the chaff spreader onto the baler 14. For example, the chaff may be received and collected on the transfer pan 20 for the pickup 18 (or on the transfer pan for the packer).

Also shown is a pivoting auger tube 24 (herein, also referred to as an auger or auger tube) as a feature of the combine 12. The auger tube 24 may be cylindrical or angled in structure (e.g., rectangle, conical, etc.). The opening of the auger tube 24 at its distal end is peripherally sealed by a joint member that hingedly engages a pivoting auger spout to interface the spout to the distal end of the auger tube 24. The joint member may be rounded or spherical, or cylindrical on a horizontal axis, so long as the interface between the auger tube 24 and pivoting auger spout is adequately sealed. In one embodiment, the pivoting auger spout pivots about an axis that is backward and forward in the direction of travel of the combine harvester 12 in FIG. 1 when the tube 24 is extended transversely) of the combine 12. In the position depicted in FIG. 1, the auger tube 24 is disposed in a position that lies along an axis parallel to the length of the combine 12. In this position, depending on the terrain, there is a potential risk of collision between the combine 12 (e.g., a component thereof, such as the auger tube 24) and the baler 14 (e.g., a component thereof, such as the outer frame of the baler), as is explained further below.

Also included are one or more sending devices 26 (one shown in side elevation) on the rear of the combine 12 and a controller 28. In one embodiment, the sending devices 26 include well-known transceiver functionality, including a baseband processing unit (e.g., with a microprocessor, digital signal processor, memory, I/O, etc.) and a radio frequency subsystem coupled via digital-to-analog (on the transmit side) and analog-to-digital (on the receive side) to the baseband processing unit. The radio frequency subsystem includes well-known modulation components (e.g., demodulation and modulation), converters (e.g., up- and down-conversion), signal generation components (e.g., oscillators, mixers, etc.), power amplifier, switches (e.g., for providing switching between receive and transmit functionality) and filters. Although described in the context of radio frequency functionality, other bands of operation are contemplated, including those for microwave, ultrasonic, optical, among others. In one embodiment, the signal transmitted by the sending device 26 may be continual, or conditional (e.g., intermittent, such as based on detected power-up of the PTO, detected coupling to a towed implement, etc.) in some embodiments. In one embodiments, transmission of a signal by the sending device 26 may be via broadcast (e.g., omni-directional), or in some embodiments, uni-directional, such as via an infrared or laser-based or other optical signal.

The controller 28 may initiate the signaling by the sending device 26. In some embodiments, the sending device 26 may act independently to initiate signaling, or in some embodiments, receive initiating signals from the baler 14. Further discussion of the controller 28 follows below.

The baler 14 comprises on its frame surface plural target devices 30 (one shown in FIG. 1). The target devices 30 may likewise comprise transceiving functionality, or in some embodiments, only receiving functionality, or merely reflective features (e.g., no active processing of the signal) in some embodiments. The target devices 30 provide positional information to the sending device 26. In other words, information carried in the signal provided to the sending device 26, such as responsive to an initiation signal, carries coordinate (e.g., Cartesian) information. Each target device 30 provides coordinate information (e.g., x, y, z) to the sending device 26, and the sensing device 22 forwards the information to the controller 28, which comprises logic to perform triangulation of the coordinate information to derive information regarding relative positioning between the combine 12 and the baler 14 that accounts for differences in pitch, yaw, and roll.

In one embodiment, an articulated machine proximity system comprises the controller 28, the sending device 26, and plural target devices 28. In some embodiments, an articulated machine proximity system comprises a subset of these components or additional components.

Figure 2:
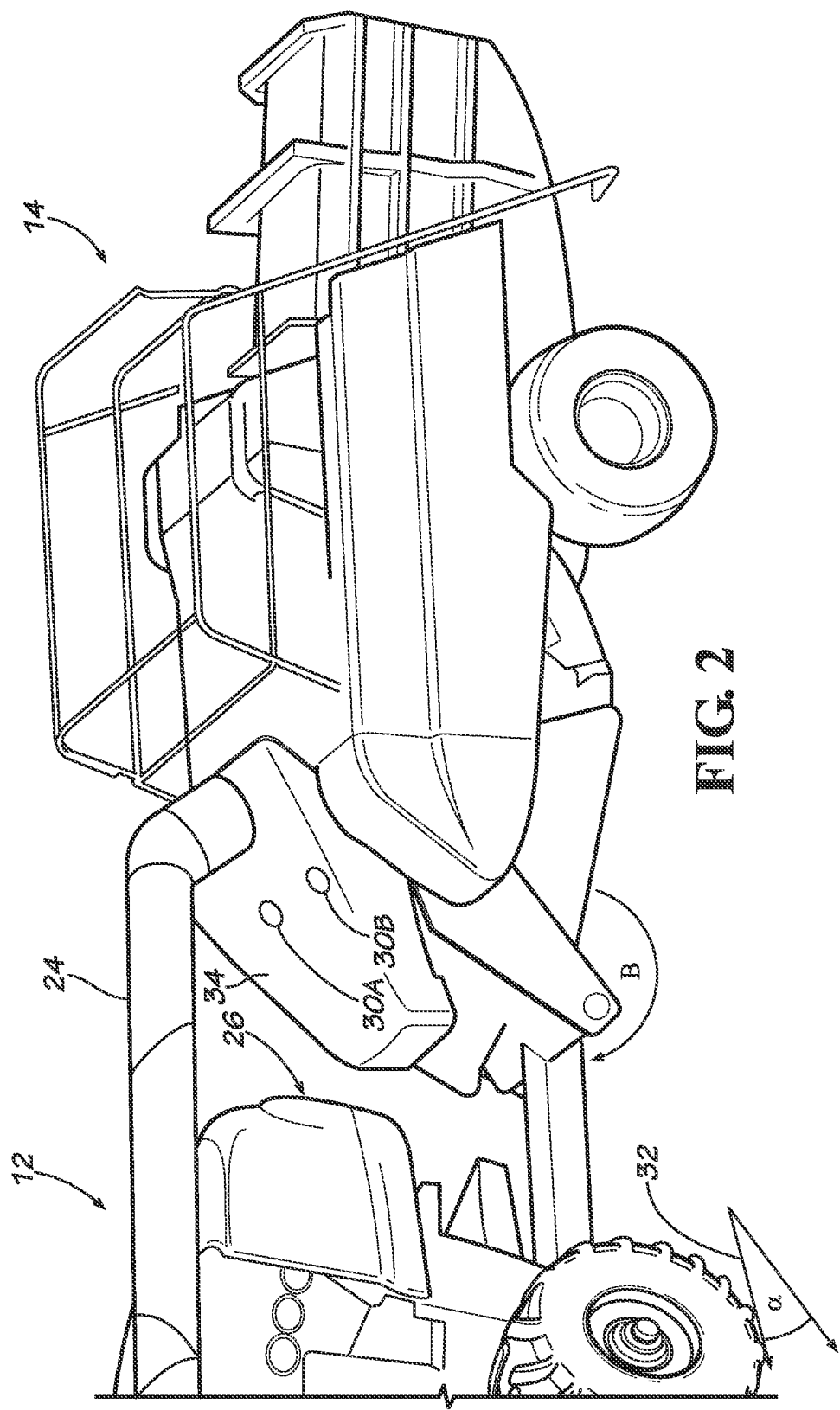
FIG. 2 is a schematic diagram that illustrates one example of a type of collision between two machines that certain embodiments of an articulated machine proximity system seeks to avoid.
Figure 3:
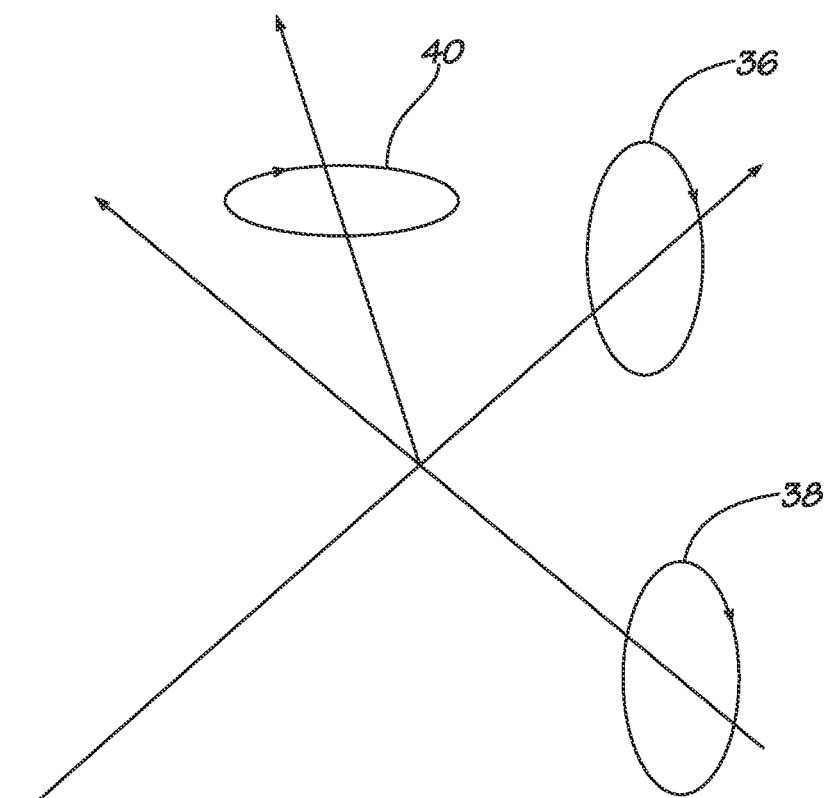
FIG. 3 is a schematic diagram that illustrates three axes which a towed machine can articulate in relationship to the towing machine and which is determined by a controller of an articulated machine proximity system.

Having described an example environment 10 in which an articulated machine proximity system may be implemented, attention is directed to FIG. 2, which illustrates the combine 12 nearly colliding with the baler 14. In this example, the combine 12 may be advancing up an incline 32 defined by a relative to the baler 14 (e.g., according to a pitch articulation). The combine 12 and the baler 14 may also have longitudinal orientation that differs according to a given angle, 13 (e.g., a yaw articulation). In addition, the baler 14 may articulate in relationship to the combine 12 in a roll articulation (e.g., each relative to one another). Conditions in the terrain (and/or load) may result in these relative articulations between the combine 12 and the baler 14, and if not controlled or monitored, may result in a collision between the combine 12 (e.g., a component of the combine 12, such as the auger tube 24) and the baler 14 (e.g., a component of the baler 14, such as the baler frame 34). Certain embodiments of an articulated machine proximity system use the relative articulations to prevent such collisions. In other words, and referring to FIGS. 2-3, each target device 30A and 30B provides a response signal (responsive to receiving an initiating signal from the sending device 26) comprising positional coordinates. The positional coordinates are received by the sending device 26, and forwarded (in some embodiments, first processed, such as via signal amplification, filtering, etc.) by the sending device 26 to the controller 28. The controller 28 determines the three axes consisting of roll 36, pitch 38, and yaw 40 via triangulation based on the positional information.

Once the three axes are computed, the controller 28 can determine based on the three axes whether a collision is imminent (e.g., whether the relative positioning between the two machines 12 and 14 is at, or within, a predefined distance). For instance, a programmed threshold in terms of the values of the three axes is stored in the controller 28 and represents a relative proximity between the two machines 12 and 14 that is as close as desired (within a given tolerance) to avoid collision. Any relative positioning that is at or closer than the threshold results in the controller 28 taking certain measures to avoid collision. A continual monitoring of these coordinates may also provide an indication of how fast the two machines 12 and 14 are approaching the threshold.

If it is determined that a collision is imminent, the controller 28 can take one of a plurality of avoidance measures. For instance, the controller 28 may cause an audible alarm to activate in the cab of the combine 12, and/or the controller 28 may activate a light-emitting diode (LED) or other type of alarm in the cab. In some embodiments, the visual alarm may comprise a graphic on a display panel of the operator console (or headset), showing graphic imagery of the relative positions between the two machines. Based on these alerts, the operator may take avoidance measures (e.g., navigating the combine 12) to avoid collision.

In some embodiments, automated avoidance measures may be implemented. For instance, the controller 28 may communicate with a navigational system in the combine 12. Upon determining that the combine 12 and the baler 14 are going to collide unless avoidance measures are implemented, the controller 28 may cause the navigational system of the combine 12 to shut down, or in some embodiments, bypass the navigational system and cause power directly to shut down. In some embodiments, the controller 28 may cause (via signaling to the navigational system or directly) the combine 12 to take other corrective action, such as causing the steering subsystem to rotate the wheels to avoid the collision. These and other measures to modify the relative manner of movement between the two machines 12 and 14 (e.g., including adjusting steering mechanisms on the baler 14) are contemplated to be within the scope of the disclosure.

In addition, for implementations where the combine 12 is dispensing crop material from the outlet of the auger tube 24 to another type of towed (or un-towed) machine, such as a grain cart, there may be difficulty in aligning the outlet of the auger tube 24 to a receptacle of the grain cart along a given axis (e.g., vertical axis) given the manner in which the combine 12 obscures an operator's view of the cart. Similarly, the backing-up of the combine 12 to a hitch of a towed machine is likely compromised due to the difficulty in viewing the same, and hence aligning along a given horizontal axis would provide a benefit to such implementations. The controller 28 may similarly use the relative proximity computations as described above to enable the operator (e.g., via a displayed graphic) to align the auger tube 24 (or other dispensing component) with the receptacle to which the crop material is dispensed along a given axis (e.g., vertical axis). Similarly, the controller 28 may use the relative proximity information to align the combine 12 to the baler 14 (e.g., at the hitch assembly) along a horizontal axis.

Figure 4:
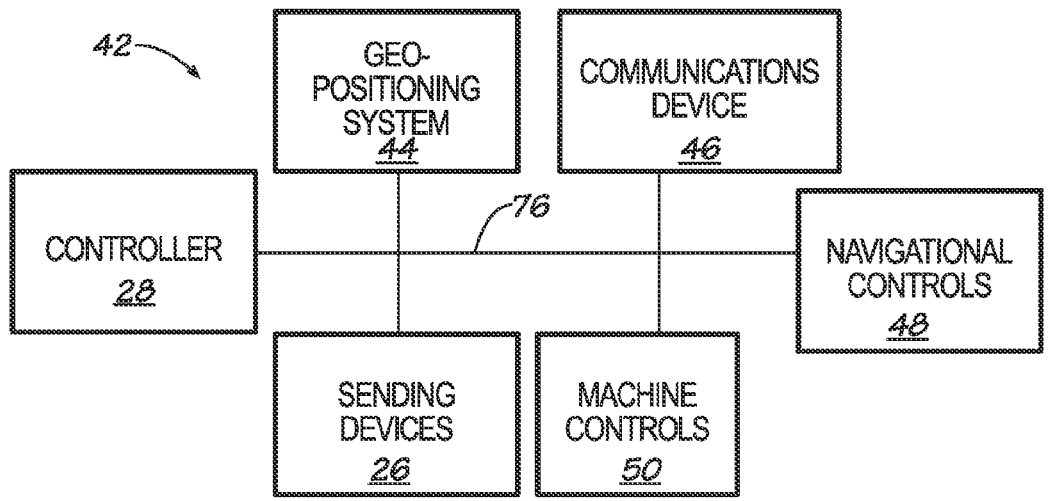
FIG. 4 is a block diagram that illustrates an example embodiment of an articulated machine proximity system.

Attention is now directed to FIG. 4, which illustrates an example embodiment of a combine control system 42. In one embodiment, an articulated machine proximity system may comprise all or a subset of the components of the combine control system 42. One having ordinary skill in the art should appreciate in the context of the present disclosure that the example combine control system 42 is merely illustrative, and that some embodiments of the combine control system 42 may comprise fewer or additional components, and/or some of the functionality associated with the various components depicted in FIG. 4 may be combined, or further distributed among additional components, in some embodiments. In one embodiment, the combine control system 42 comprises the controller 28, one or more of the sending devices 26, a geo-positioning system 44 (e.g., global positioning system (GPS), geographic information system (GIS), etc.), a communications device 46, navigational controls 48, and machine controls 50, all coupled over a network 52, such as a controller area network (CAN), though not limited to a CAN network or a single network. The sending devices 26, as discussed above, may comprise transceiver functionality, such as radio frequency, optical, ultrasonic, among other bands of operation. The controller 28 may comprise a computing device, such as a proportional-integral-derivative (PID) controller, a programmable logic controller (PLC), a computing device with an operating-system based execution system, or integrated circuit, among other types of devices, as described further below.

The geo-positioning system 44 enables the detection of a geofence, as well the detection of positioning of the combine 12 in the field, detection of sensitive areas (e.g., buffer areas), and topographic boundaries, etc. In addition, the geo-positioning system 44 enables auto-navigation in certain fields.

The communications device 46 enables the communication of information with other devices and/or networks (e.g., including mesh networks). Communication may include telephonic as well as datagram type traffic. For instance, the communications device 46 comprises a modulator/demodulator (e.g., a modem), wireless (e.g., radio frequency (RF)) transceiver, a telephonic interface, among other network components.

The navigational controls 48 collectively comprise the various actuators and/or controlled devices residing on the combine 12 to control machine navigation. Controls 48 involved with machine navigation include those involved with advancing the combine 12 through a field or over a roadway, including steering subsystems, engine/drivetrain, etc.

The machine controls 50 include auger controls, chopper controls, among other subsystem controls that are used to control operation corresponding to the pickup, process, and/or disposition of crop material.

Note that functionality of two or more of these components may reside in a single device. For instance, the controller 28 may include the sending devices 26, and be located in the cab of the combine 12. Such an implementation may enable communication with the target devices 30 over a wireless network, such as Bluetooth, among others.

Figure 5:
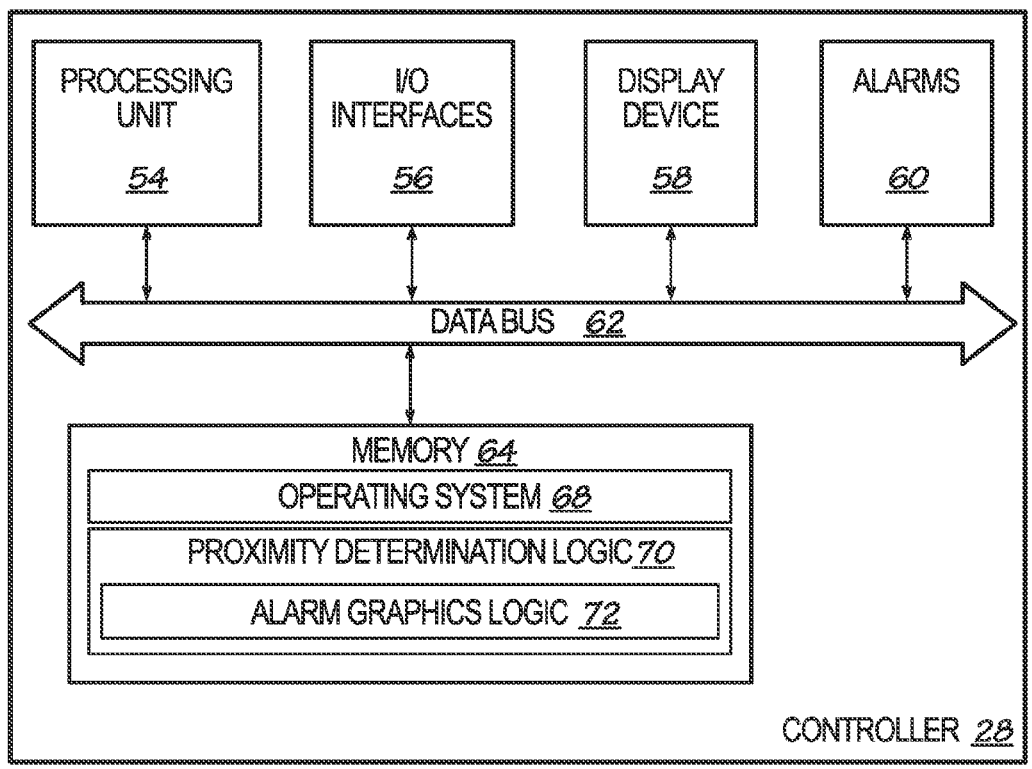
FIG. 5 is a block diagram that illustrates an example embodiment of a controller of an articulated machine proximity system.

As indicated above, the controller 28 receives and processes the position information from the sending devices 26 (which is received from the target devices 30), and determines the relative positioning between the combine 12 and the baler 14. FIG. 5 further illustrates an example embodiment of the controller 28. One having ordinary skill in the art should appreciate in the context of the present disclosure that the example controller 28, depicted as a computer system, is merely illustrative, and that in some embodiments, may be configured as a semiconductor chip, programmable logic controller, or other processing device with the same or different functionality than illustrated in FIG. 5. In some embodiments, functionality illustrated for the controller 28 may be distributed among plural devices coupled to the controller 28 over the network 52 (FIG. 4). Certain well-known components of computer systems are omitted here to avoid obfuscating relevant features of the controller 28. In one embodiment, the controller 28 comprises one or more processing units 54, input/output (I/O) interface(s) 56, a display device 58, and alarms 60, all coupled to one or more data busses, such as data bus 62. A memory 64 is further included in the controller 28.

The memory 64 may include any one or a combination of volatile memory elements (e.g., random-access memory RAM, such as DRAM, and SRAM, etc.) and nonvolatile memory elements (e.g., ROM, hard drive, tape, CDROM, etc.). The memory 64 may store a native operating system, one or more native applications, emulation systems, or emulated applications for any of a variety of operating systems and/or emulated hardware platforms, emulated operating systems, etc. In the embodiment depicted in FIG. 5, the memory 64 comprises an operating system 68, proximity determination logic 70 (e.g., software and/or firmware), and alarm graphics logic 72 (e.g., software and/or firmware). It should be appreciated that in some embodiments, additional or fewer software modules (e.g., combined functionality) may be employed in the memory 64 or additional memory. In some embodiments, a separate storage device may be coupled to the data bus 62, such as a persistent memory (e.g., optical, magnetic, and/or semiconductor memory and associated drives).

The proximity determination logic 70 receives the positional information sourced from the target devices 30 and forwarded to the controller 28 via the I/O interfaces 56. The proximity determination logic 70 computes the relative position along three axes between the combine 12 and the baler 14 via triangulation. In some embodiments, the proximity determination logic 70 may compute relative positioning via other methods, such as by receiving three axes information from inertial sensors located on the baler 14 and further based on geo-positional information (e.g., to derive attitude of the combine 12 and baler 14). In either case, the proximity determination logic 70 compares the current positional information in three axes (pitch, yaw, roll) with predetermined threshold values corresponding to the proximity of the combine 12 and baler 14.

If the baler 14 is too close according to the threshold values, the proximity determination logic 70 signals to the alarms 60 (e.g., to activate visual and/or audio alarms) and/or signals to the alarm graphics logic 72. The alarm graphics logic 72 is configured to generate a graphic of the combine and the baler 14 and their relative positioning based on the computed relative locations of the combine 12 and baler 14, and provide the graphic on the display device 58 (e.g., for alerting the operator of the combine). In some embodiments, the graphics may merely be a visual warning (e.g., in text, or more rudimentary graphic symbols) displayed on the display device 58, or in some embodiments, omitted.

In addition to, or in lieu of alerting the operator in some embodiments, the proximity determination logic 70 signals over the network 52 (via I/O interfaces 56) to the machine controls 50 and/or navigational controls 48 to take avoidance measures (e.g., to avoid collision). For instance, signaling to the machine controls 50 may cause the auger controls to rotate the auger tube 24 to avoid collision with the baler. As another example, signaling to the navigational controls 48 may cause the combine 12 to shut down (e.g., by cutting power to the PTO), or alter the current direction of movement (e.g., via signaling to steering controls to cause a steering maneuver to offset a roll or yaw movement). Other collision avoidance measures may be undertaken and contemplated to be within the scope of the disclosure.

In implementations where directed guidance of a component of the combine relative to a towed implement is required (e.g., to align the discharge outlet of the auger tube 24 to a grain cart bed), the proximity determination logic 70 signals over the network 52 to the machine controls 50 to position the auger tube 24. In some embodiments, such as where the combine 12 is not coupled to a receiving vehicle (e.g., a truck equipped with target devices, where the truck bed is to receive the crop material from the outlet of the auger tube 24), the proximity determination logic 70 signals over the network 52 to the navigational controls 48 and machine controls 50 to move the combine close enough to the bed of the truck and align the tube 24 with the bed.

Execution of the software modules 68, 70, and 72 in memory 64 is implemented by the processing unit 54 under the auspices of the operating system 68. In some embodiments, the operating system 68 may be omitted and a more rudimentary manner of control implemented.

The processing unit 54 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 28.

The I/O interfaces 56 provide one or more interfaces to the network 52, as well as interfaces for access to computer readable mediums, such as memory drives, which includes an optical, magnetic, or semiconductor-based drive. In other words, the I/O interfaces 56 may comprise any number of interfaces for the input and output of signals (e.g., analog or digital data) for conveyance over the network 52 and other networks. The I/O interfaces 56 may further comprise I/O devices that the operator uses to enter commands, such as keyboards, or mouse, microphone, among others.

The display device 58 may comprise a liquid crystal diode (LCD), cathode ray tube (CRT), or other types of display devices. In some embodiments, the display device 58 may be embodied as a head-mounted display, such as an immersive stereoscopic environment. In some embodiments, the display device 58 may be configured for touch-screen entry. Presented on the display device 58 may be a graphics user interface (GUI), where the operator can select button icons (e.g., via the I/O interfaces 56) and or observe alarms, such as graphics alerting the operator of an impending collision and/or directing the operator to maneuver the auger tube 24 in relationship to a truck bed or grain cart located behind the combine 12.

The alarms 60 may comprise visual and/or audio alarms, including audible alarms (e.g., buzzers), warning lights (e.g., LED), etc.

The transceiver 70 includes functionality to enable wired or wireless communication, such as locally or via a network to a remote location. As a non-limiting example, the transceiver 70

When certain embodiments of the controller 28 are implemented at least in part in logic configured as software/firmware, as depicted in FIG. 5, it should be noted that the logic can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program for use by or in connection with a computer-related system or method. The logic may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 28 are implemented at least in part in logic configured as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6:
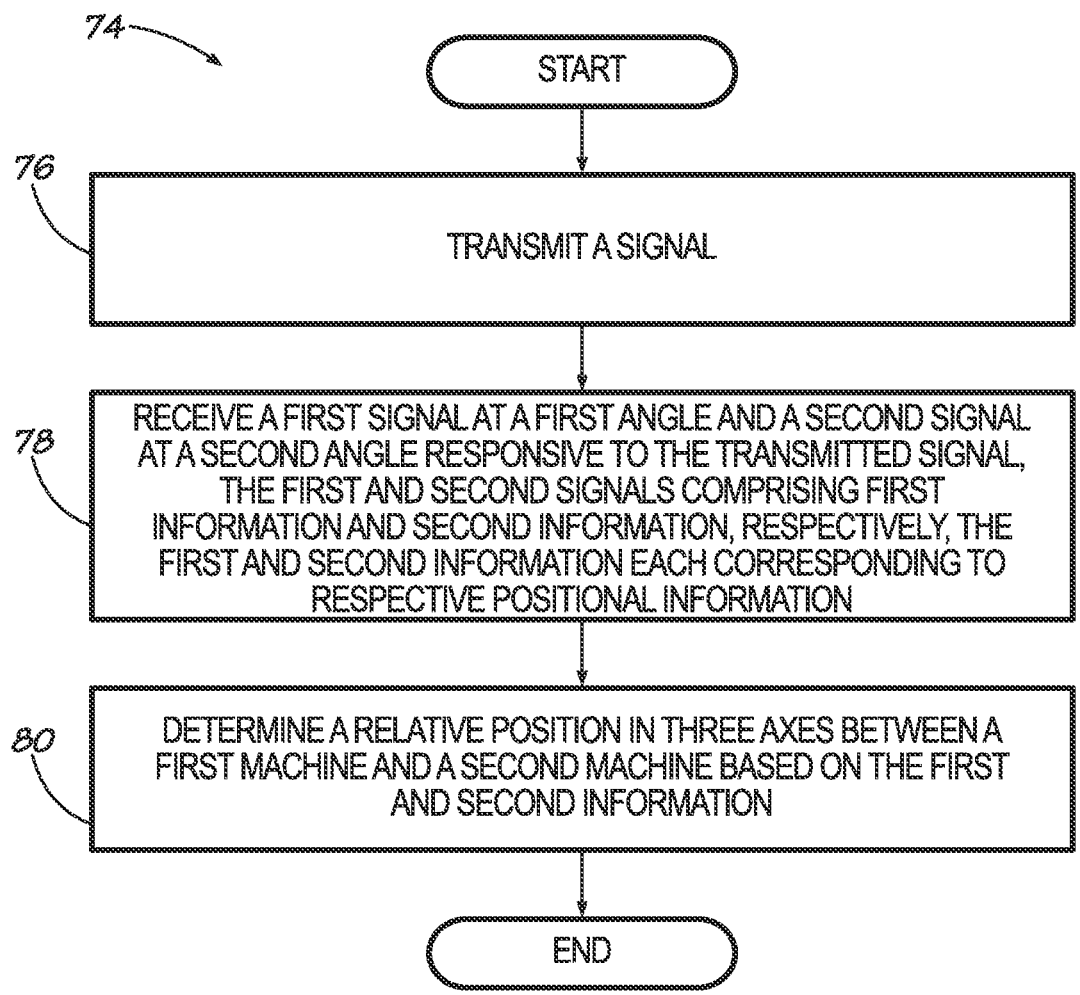
FIG. 6 is a flow diagram that illustrates an embodiment of an articulated machine proximity method.

Having described certain embodiments of an example controller 28 and combine control system 42, attention is directed to the flow diagram shown in FIG. 6, which is an example method 74 transmitting a signal (76); receiving a first signal at a first angle and a second signal at a second angle responsive to the transmitted signal, the first and second signals comprising first information and second information, respectively, the first and second information each corresponding to respective positional information (78); and determining a relative position in three axes between a first machine and a second machine based on the first and second information (80).

Any process descriptions or blocks in flow charts should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure. Further, it should be appreciated that the above-described method of FIG. 6 is not necessarily limited to the architectures of the combine control system 42 or controller 28 depicted in FIGS. 4 and 5.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. An articulated machine proximity system, the system comprising:
   a first device comprising a transceiver, the first device configured to:
      transmit a signal;
      receive a first signal at a first angle and a second signal at a second angle responsive to the transmitted signal, the first and second signals comprising first information and second information, respectively, the first and second information each corresponding to respective positional information;
   a controller coupled to the first device, the controller configured to determine a relative position in three axes between a first machine and a second machine based on the first and second information; and wherein the controller is configured to cause a component of the first machine to align with a component of the second machine along a first axis.

2. The system of claim 1, wherein the controller is configured to determine the relative position based on a triangulation computation.

3. The system of claim 1, wherein the three axes consist of pitch, roll, and yaw.

4. The system of claim 1, wherein the first axis is either a horizontal axis or a vertical axis.

5. The system of claim 1, wherein the controller is configured to alert an operator when the relative position between the first machine and the second machine closes to within a threshold distance.

6. The system of claim 5, wherein the controller is configured to alert the operator by providing a visual alert, an audio alert, or a combination of both.

7. The system of claim 1, wherein the controller is configured to automatically cause one of the first machine or the second machine to modify a current manner of movement responsive to the relative position between the first machine and the second machine closing to within a threshold distance.

8. The system of claim 7, wherein the controller is further configured to alert an operator when the relative position between the first machine and the second machine closes to within a threshold distance.

9. The system of claim 1, wherein the relative position between the first machine and the second machine comprises a relative position between a first component of a towing vehicle and a second component of a vehicle towed by the towing vehicle.

10. The system of claim 9, wherein the first component comprises an unloading auger of a combine harvester machine and the second component comprises a frame of a baler.

11. The system of claim 1, wherein the first device is configured to receive the first signal from a second target device and the second signal from a third target device.

12. The system of claim 11, wherein the first device is located on the first machine embodied as a towing machine and the second and third devices are coupled to the second machine embodied as a towed machine.

13. The system of claim 11, wherein the second and third devices are located on the first machine embodied as a towing machine and the first device is coupled to the second machine embodied as a towed machine.

14. The system of claim 1, wherein the controller and the first device are co-located in a single integrated processing unit.

15. The system of claim 1, wherein the first device is configured to transmit the signal as either a broadcast signal or a non-broadcast signal.

16. The system of claim 11, further comprising one or more first additional devices of like-functionality to the first device and one or more second additional devices of like functionality to the second and third devices.

17. An articulated machine proximity system, the system comprising:
a controller configured to:
receive first information corresponding to a first set of positional information;
receive second information corresponding to a second set of positional information;
determine a relative position in three axes between a towing machine and a towed machine based on triangulation of the first and second information;
cause an action responsive to the determination, the action comprising one or more of:
alerting an operator when the relative position between the towed machine and the towing machine closes to within a threshold distance;
cause one of the towed machine or the towing machine to modify a current manner of movement responsive to the relative position between the towing machine and the towed machine closing to within the threshold distance; or
cause a component of the towing machine to align with a component of the towed machine along a first axis; and
plural transceiver devices located on the towed machine and at least one target device located on the towing vehicle, the plural transceiver devices configured to receive first and second signals corresponding to the first and second information, respectively, from the at least one target device, the first and second signals received at different angles, the plural transceiver devices configured to communicate the first and second information to the controller.

18. An articulated machine proximity method, the method comprising:
transmitting a signal;
receiving a first signal at a first angle and a second signal at a second angle responsive to the transmitted signal, the first and second signals comprising first information and second information, respectively, the first and second information each corresponding to respective positional information;
determining a relative position in three axes between a first machine and a second machine based on the first and second information; and using a controller to cause a component of the first machine to align with a component of the second machine along a first axis.

19. An articulated machine proximity system, the system comprising:
a first device comprising a transceiver, the first device configured to: transmit a signal;
receive a first signal at a first angle and a second signal at a second angle responsive to the transmitted signal, the first and second signals comprising first information and second information, respectively, the first and second information each corresponding to respective positional information;
a controller coupled to the first device, the controller configured to determine a relative position in three axes between a first machine and a second machine based on the first and second information; and
wherein the controller is configured to alert an operator when the relative position between the first machine and the second machine closes to within a threshold distance.

* * * * *